May 16, 1972   M. A. PETERSON   3,663,510
PROCESS FOR PRODUCING POLYAMIDE COATING MATERIALS
Filed May 8, 1969

INVENTOR.
Marvin A. Peterson,
BY John M. Stoudt
Attorney.

United States Patent Office 3,663,510
Patented May 16, 1972

3,663,510
PROCESS FOR PRODUCING POLYAMIDE
COATING MATERIALS
Marvin A. Peterson, Fort Wayne, Ind., assignor to
General Electric Company
Filed May 8, 1969, Ser. No. 823,108
Int. Cl. C08g 20/32
U.S. Cl. 260—65
25 Claims

ABSTRACT OF THE DISCLOSURE

In the present invention, I prepare polyamide prepolymers from aromatic dianhydride and aromatic diamine materials by first producing a stable nonionic precursor material in the form of the reaction product of an aromatic dianhydride and aromatic diamine in the molar ratio of 2/1. There is then added to this stable precursor which may be represented by the formula XYX, wherein X represents aromatic dianhydride and Y represents aromatic diamine, a slight molar excess of Y and in so doing, I do not follow the expected path of polymerization which had been predicted. Instead, the XYX tends to polymerize only up to a certain point and then I complete the polymerization to any desirable molecular weight range by slowly adding a predetermined additional amount of dianhydride X as a back addition. In this manner, the path of reaction followed by inherent viscosity which is an indicator of molecular weight, then climbs sharply and by means of slowly adding the anhydride I can closely control the molecular weight, substantially increasing such molecular weight and narrowing the range of molecular weight of the polyorthoamic acid prepolyimide material. I can thereby through this procedure obtain any preselected desirable molecular weight range by the back addition of dianhydride to amine terminated polyamide prepolymers.

BACKGROUND OF THE INVENTION

Figure 1:
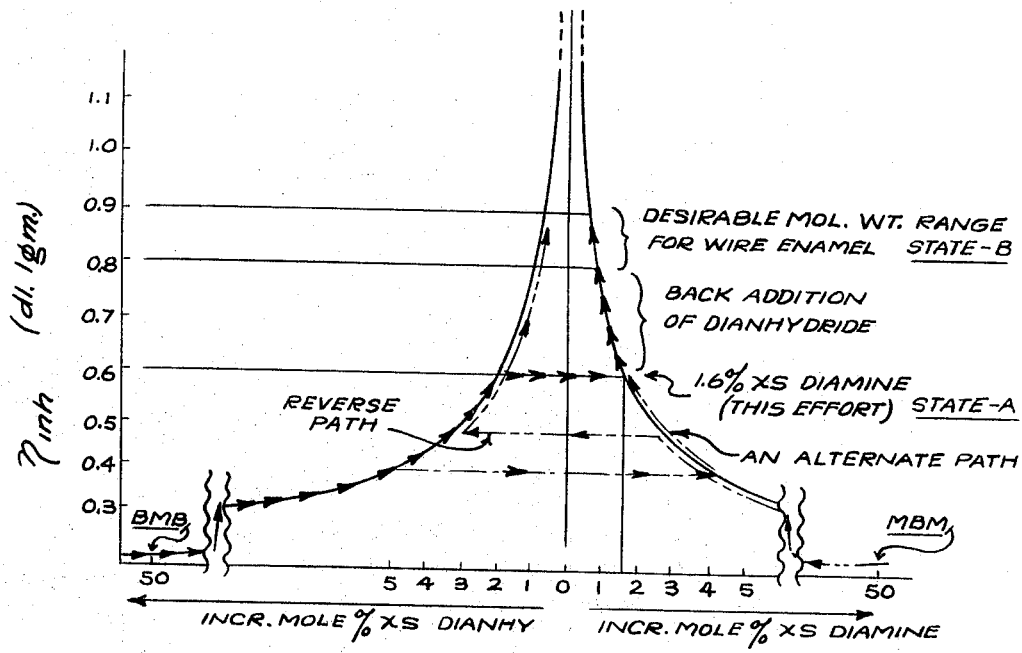

It is known in the prior art that polyimide insulation coatings for magnet wire have excellent insulation coating properties including strength, performance at elevated temperatures, high electrical cut-through resistance, and a high dielectric value, all of which contribute to their recognized value as insulation coating.

Polyimides are derived from the reaction product of aromatic dianhydrides and aromatic diamines. Until recently certain undesirable properties of the prepolymeric material with respect to its solvent requirements, relative inability to control viscosity and ultransensitivity to water have inhibited its use. Such prepolymeric materials have to be prepared within a solvent system which is expensive in composition and presents substantial disposal problems since they are objectionable pollutants. The latter problem is particularly so in present day conventional wire enamels in organic solvents. It has proved extremely difficult in coating procedures to obtain the necessary viscosity and solids/solvents ratio for a specific coating operation. These problems are to a large extent now overcome by recent discoveries which are contained in my copending applications "Improved Process for Producing Coating Materials" U.S. application Ser. No. 803,037, filed Feb. 27, 1969 and "Improved Process for Producing Wire Coatings From Prepolymeric Materials" U.S. application Ser. No. 822,899, filed May 8, 1969, both of which are assigned to the same assignee as the present application. In these applications, I teach the conversion of polyorthoamic acid precursor to polyorthoamate which is water soluble and which enables the user to replace a substantial portion of the organic solvent with water. Since the solvent had been previously lost to the system, I effect substantial savings in the form of replacing such solvents and also I obviate the difficulties of contamination and waste disposal. In the second of my copending applications I teach the formation of a stable precursor material which is made up in the molar ratio of 2/1 of the aromatic dianhydride and aromatic diamine which then can be partially converted to a polyimide form. I then add either aromatic dianhydride or aromatic diamine to effect coupling of the precursor materials and formation of a partially imidized polyorthoamic acid of higher molecular weight. I then add ammonia to form poly (ammonium orthoamate-imide). In the precursor form, obtained with 2/1 molar ratios, I obtain a material which can be controllably imidized in order to control the viscosity and solids/solvents ratio of the coating material. By means of the ammonium addition I can utilize water as the solvent.

I have discovered there is a definite relationship between the molecular weight of the finished polyorthoamic acid prepolyimide and its method of prepartion. Since the best insulation coating materials are those having maximum molecular weight and a range of molecular weight which is as narrow as possible, my discovery bears directly upon the ability of produce improved insulation coatings of a consistant high quality value.

OBJECTS OF THE INVENTION

The principal object of the present invention is to provide a new and improved process for producing polyorthoamic acid prepolymeric materials from aromatic dianhydride and aromatic diamine by first preparing a precursor from such reactants in a molar ratio of 2/1, then adding diamine or dianhydride in a molar excess and then back-titrating to a desired molecular weight range, generally to a molar ratio of reactants approaching 1.000/1.000. The resulting product is one having a preselected molecular weight range of polyorthoamic acid prepolyimide and the range of molecular weights in the final product falls within a relatively narrowed range.

A further object of the present invention is to provide the formulator of prepolyimide materials with a synthesizing technique which is useful in closely controlling the range of molecular weights of a prepolyimide coating material to thereby control or tailor-make the physical properties of the finished material.

It is a further object of the present invention, by means of controlling the molecular weight and molecular weight distribution, to place within the election of the formulator a means for controlling the polydispersity and obtainment of the desired viscosity/solids ratio for given application of such materials through the use of floating dyes in a conventional wire enameling tower.

It is a still further object of the present invention to provide a new and improved process for preparing polyorthoamic acid material from aromatic dianhydride (X) and aromatic diamine (Y) in which the precursor in the form of XYX or YXY is first formed as a precursor from the aromatic dianhydride and an aromatic diamine into which an excess of X or Y is then added beyond its molar ratio requirement and then back-titrating to a near 1.000/1.000 ratio whereby in the finished product a controlled molecular weight is achievable.

Other objects and features of the present invention will become apparent from a consideration of the following description which refers to the accompanying drawings.

IN THE DRAWINGS

Figure 2:
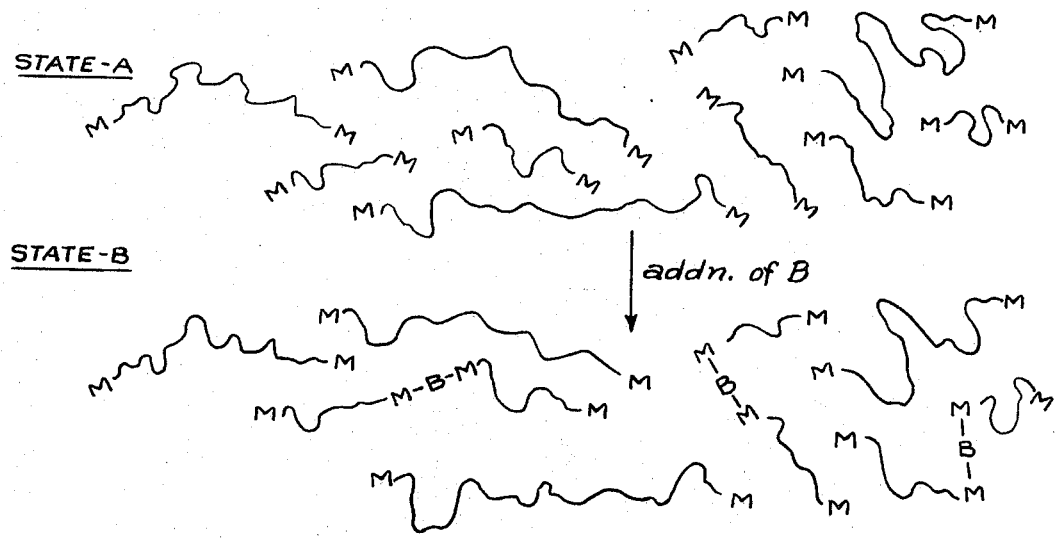

FIG. 1 is a graph illustrating inherent viscosity versus molar ratio of reactant, the arrow-headed line on the graph illustrates the reaction path which is followed in accordance with the present invention, the dotted being another acceptable path; and FIG. 2 presents diagrammatic views of the precursor material labeled State A corresponding to that portion of the curve in FIG. 1 which is also labeled State A, and State B corresponding to the polyorthoamic acid and to that portion of the curve in FIG. 1 which is also labeled State B.

GENERAL DESCRIPTION OF THE INVENTION

Prepolyimide insulation coating enamels are produced from the reaction product fo aromatic dianhydrides (X) and aromatic diamines (Y) in accordance with the following general overall reaction:

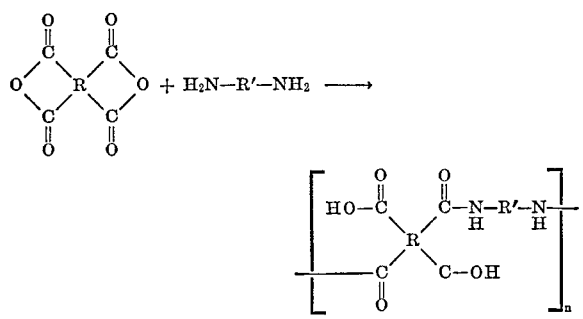

I have found that the best procedure for making such propolyimides is from precursor materials of the Formula XYX or YXY from molar ratios of 2/1 and forming a reaction product to which either X or Y is then added in excess and thereafter back-titrated to form a molar ratio approaching 1.000/1.000. In this general reaction, X is an aromatic dianhydride and Y is an aromatic diamine. I have found that the precursor in the form of either XYX or YXY is a stable, identifiable material which is separately synthesizable and which is a valuable product in that it can be controllably imidized before further polymerization and by so controlling the degree of imidization I can control the viscosity and the solids/solvent ratio of optimum coating operation. The technique for obtaining the XYX or YXY precursor, the relationship of imidization to viscosity, the synthesis temperature etc. are all fully set forth in my copending application entitled "Improved Process for Producing Wire Coating From Prepolymeric Materials" (supra).

One would normally expect on the basis of existing knowledge of the art, that slowly adding X to YXY precursor or slowly adding Y to XYX precursor in an excess molar amount, would produce not much in the way of a difference to adding a simple one mole part Y to a one mole part XYX, or 1 mole part X to 1 mole part YXY. Quite the contrary however has proved to be the case. For example, referring to FIG. 1, I have discovered that starting with an XYX precursor and adding a molar excess of Y will result in a path of reaction along the arrow-headed line. As Y is added to the XYX precursor at a molar excess of Y, such as the indicated 1.6% excess, the path of reaction bridges or "tunnels across" the reaction curve, intersecting the reaction path which orginates along the YXY path. I then proceed to add X to the reaction materials to back-titrate along the portion of the curve labeled "back-titration" until reaching a molar ratio of XYX to Y which approaches 1.000/1.000. If, as in the present example, it is desired to form a reaction product polymer for conventional wire enamel floating dye having an inherent viscosity of approximately 0.80–0.83 dl./gm., the procedure of back-titration is followed in the manner indicated in FIG. 1. There is also obtained in addition to a desirable molecular weight of the polyorthoamic acid, a narrow range of molecular weight product. The totally unexpected path of reaction which occurs by slowly adding a molar excess of Y to an XYX precursor, is that the reaction proceeds along only a portion of the sloping part of the graph and then "tunnels through" to the opposite sloping part of the graph without ever going through the peak which would have been expected based on normal experience of this art. By then proceeding to back-titrate I can achieve a close control of the final molecular product and range, all of this being within the option of the formulator.

Assuming now a particular reaction product, and specific reactants, the aromatic dianhydride may consist of 3,3', 4,4'-benzophenonentetracarboxylic dianhydride (BPDA) having the formula:

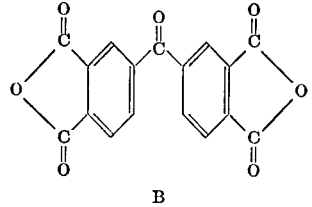

The aromatic diamine may consist of 4,4'-methylenedianiline (MDA) having the formula:

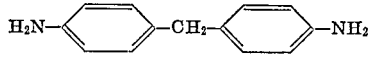

These two materials when combined together in the molar ratio of two parts BPDA and one part MDA will form a precursor having the formula:

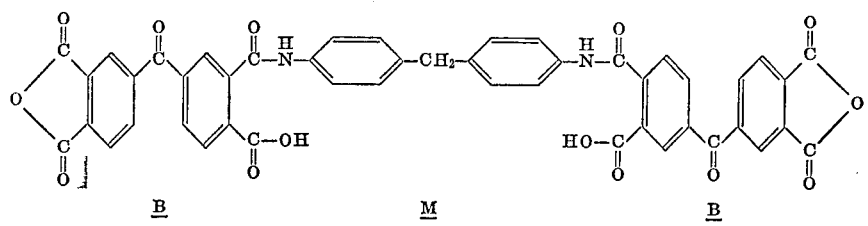

This precursor is known as BMB and it may be partially imidized to an extent providing the desired viscosity and solids/solvent characteristics. The controlled half-imidization reaction product is a stable compound in accordance with the following structure:

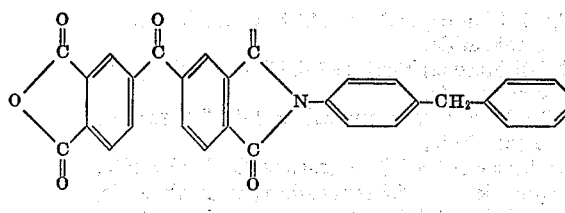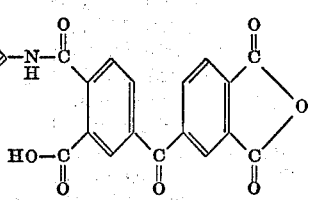

The imidization temperature is the temperature at which appreciable imidization occurs and if it is desired to avoid imidization the reaction of aromatic diamine and carbocyclic dianhydride should occur below the imidization temperature so that the bis-amide will form but without an accompanying amide-imide formation.

At the time the precursor is to be formed into larger polymeric units of prepolyimide polymer I add M to the BMB polymer to "zip up" i.e. to couple these stable precursor units in an environment of dry solvent which may consist of N-methyl-2-pyrrolidone under dry nitrogen at temperature preferably below 50° C. By adding an excess of M, the terminal groups are amine and the reaction may be expressed as the following:

M+BMB+xs M→M BMB M BMB . . . M BMB M

I not only can add M to the BMB, I can also add MBM to BMB and during back-titration I can add BMB to the 1.6% excess, both of these procedures are equivalent to adding M and B separately.

The process of producing the polyamides entails first dissolving the anhydrous carbocyclic aromatic dianhydride and aromatic diprimary diamine, wherein the molar ratio of dianhydride to diamine is 2/1, in an organic solvent which is nonreactive with either of the reactants, but is a solvent for the reaction product.

These are reacted at a temperature below the imidization temperature, to form a stable precursor bis-amide of the general formula XYX, wherein:

X is

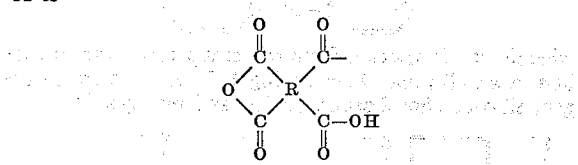

Y is —NH—R'—NH—,
R is an aromatic carbocyclic radical, and
R' is an aromatic radical.

I then add a solution phase molar ratio excess of said diamine (Y) to the XYX and thereafter slowly back-titrate below the imidization temperature the product formed with said dianhydride to react with the terminal diamine groups to approach a 1/1 ratio of said dianhydride to said diamine.

It has been found, that the polyimide should be terminated with an M group rather than a B since an anhydride terminal or acid terminal group is undesirable in wire coating. For that reason, the slight excess amine side of the graph is desired. The sensitivity of the dianhydride powder to water which is an impurity versus the relatively inert diamine flake makes the BMB route preferred to the MBM route, therefore I generally follow the BMB route (FIG. 1) and add 1.4–1.6% excess moles of M to BMB, or M/BMB=1.061/1.000, then back-titrate with B to the desired molecular weight range by following the right hand sloping part of the reaction path curve (FIG. 1) to a completion. By not adding excess M to the BMB and following the sloping acid side of the curve, the best that can be achieved from the then acid side approach is a molecular weight product which is considerably lower than that obtainable by following the arrow-headed reaction path, the undesirable acid terminals emerge, and the range of molecular weights is considerably more diffuse.

It should be understood that the 1.6% molar excess of M is not critical; I can also use 1.4% excess M, the only critieria is that of selecting an excess percent which will "tunnel through" to a point on the curve (FIG. 1) which is relatively lower on the curve at its shallow slope portion; consequently, results are much more easily duplicative and the reaction is more controllable. For example, from examining the curve it will be noted that it begins to slope sharply upwardly as the reactant molar proportions approach 1.000 to 1.000 and I prefer to avoid the steep portion of the curve as the point to "tunnel through" since it is much more difficult to control the reaction at the steeper part of the curve approaching the 1.000/1.000 molar ratio of reactants. I prefer to "tunnel through" at 1.6% excess molar percent to about 1.4% molar percent excess for optimum results; while the specific percent molar excess is not critical, for best results I have found it preferable to work at the shallow portion of the curve. I also prefer to start with BMB side of the curve since the B is water sensitive and should be all dissolved at once and kept under a dry nitrogen protection atmosphere leaving the M as the addition since it is in flake form and is easier to handle and will not scavenge water (moisture) which is an impurity in the synthesis.

While I am unable on any theoretical basis to state why there is the "tunneling through" which develops by following the described procedure, I believe there is some basis for explaining the reaction events, which can be understood, from reference to FIG. 2.

By starting with BMB and adding a substantial molar excess of M on the order of 1.6% I produce a material which may be illustrated pictorially as State A, FIG. 2, this corresponding to State A labeled on FIG. 1 and defined as units of BMB zipped up with M and M terminated. It will be noted that all of the molecular units of State A are M terminated and by the addition of B, each molecular unit is effectively doubled. Of course, in this reaction process it is more probable that B will react with a lower molecular weight unit because of this greater mobility and there will be a selective reaction of that type. As a consequence, the molecules of State B are defined as the reaction product of the addition of B to the State A material achieved along the steep slope portion of the curve FIG. 1 all tend to achieve approximately the same molecular weight and since each reaction produces a doubling of molecular weights along a geometrical ratio there tends to occur a rapid coupling of the molecular units to a high average molecular weight and virtually none of the polymer units remain at the lower state because of the more probable reactivity of B with such lower, more mobile molecular units.

In the end product, it then becomes apparent that the molecular weight stages produced tend to be highly uniform and of an average high molecular weight end product. After the B has reacted with a low molecular weight unit there is a high probability that such entities then react by coupling with the terminal M of another polymer unit so that on the average, the end products are substantially all M terminated. Consequently, terminal amine grouping of the polymeric units is maintained and the average molecular weight of the system increases rapidly. Once State A is achieved as indicated in FIG. 1, and FIG. 2, it is possible by precise addition of the amount of B to back-titrate along the portion of the curve labeled "back-titrate" to the exact range of molecular weight for wire enameling operation. It is this precise control which is highly desirable because of the relationship between molecular weight, range of molecular weight and the physical properties of the insulation coating, the general relationship being that the narrower the range of molecular weights and the higher molecular weights, the better the coating.

At the terminal portion of the back-titration I "end cap" the molecule of polyorthoamic acid by adding p,p'-methylenedianiline or aniline, or any primary amine but preferably not unlike the amine portion of the parent molecule, in order that the molecule will not be acid or anhydride terminated. If an excess is added it causes some regression or less of molecular weight but a slight excess and the corresponding slight loss is itself good evidence of complete "end cap" or assurance of amine termination.

It should be understood, that "inherent viscosity" is an indirect measure but a reliable index of the molecular weight achieved. This relationship applies with polymers possessing no fixed charges, the viscosity of the solution being divided by the viscosity of the solvent resulting in the relative viscosity, $\eta_r$. The specific viscosity, $\eta_{sp} = \eta_r - 1$, expresses the incremental viscosity attributable to polymeric solute. The ratio $\eta_{sp}/C$ is termed the inherent viscosity and is a measure of the specific capacity of the polymer to increase the relative viscosity. For the typical non-polyelectrolyte, plots of $\eta_{sp}/C$ against $C$ usually are very nearly linear and the data are handled adequately by the Huggin's equation, $\eta_{sp}/C = [\eta] + K[\eta]^2 C$. The limiting value of this ratio at infinite dilution is called the intrinsic viscosity, $[\eta]$, $$[\eta] = (\eta_{sp}/C)_{C \to 0} = [(\eta_r - 1)/C]_{C \to 0}$$

generally expressed with units of deciliter per gram. When intrinsic viscosities of a series of fractionated linear polymer homologs are plotted against their molecular weights on a log log plot, a linear relationship is found and can be expressed as $[\eta] = K'M^\alpha$ where $K'$ and $\alpha$ are constants (slope and intercept, respectively). Since it is relative values with which we are herein concerned, the less cumbersome inherent viscosity at $C = 0.500$ gm./dl. in N-methyl-2-pyrrolidone at 37.8° C. is employed throughout to index the molecular weight range unless otherwise indicated.

I am not limited to BPDA or MDA as the aromatic dianhydride or aromatic diamine. Other acceptable aromatic dianhydride materials, aromatic diamines will be next described.

AROMATIC DIANHYDRIDE

The aromatic dianhydrides that are useful in the process of this invention are those having the formula:

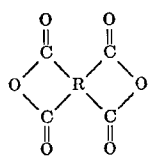

wherein R is a tetravalent radical containing at least one ring of 6 carbon atoms and having benzenoid unsaturation, each pair of carboxyl groups being attached to a different adjacent carbon atoms. These dianhydrides include, for example, pyromellitic dianhydride,
2,3,6,7-naphthalenetetracarboxylic dianhydride,
3,3',4,4'-benzophenonetetracarboxylic dianhydride,
benzene-1,2,3,4-tetracarboxylic dianhydride,
bis (3,4-dicarboxyphenyl) sulfone dianhydride,
bis (2,3-dicarboxyphenyl) methane dianhydride,
2,6-dichloronapthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
naphthalene-1,4,5,8-tetracarboxylic dianhydride,
naphthalene-1,4,5,8-tetracarboxylic dianhydride,
naphthalene-1,2,4,5-tetracarboxylic dianhydride,
3,3',4,4'-diphenyltetracarboxylic dianhydride,
1,2,5,6-naphthalenetetracarboxylic dianhydride,
2,2',3,3'-diphenyltetracarboxylic dianhydride,
2,2-bis (3,4-dicarboxyphenyl) propane dianhydride,
3,4,9,10-phenylenetetracarboxylic dianhydride,
bis (3,4-dicarboxyphenyl) ether dianhydride,
2,2-bis(2,3-dicarboxyphenyl) propane dianhydride,
1,1-bis(2,3-dicarboxyphenyl) ethane dianhydride,
1,1-bis(3,4-dicarboxyphenyl) ethane dianhydride,
and the like.

ORGANIC DIAMINE

The organic diamines that are useful in the process of this invention are those having the formula:

$$H_2N-R'-NH_2$$

wherein R' is a divalent radical selected from the class consisting of

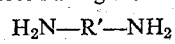

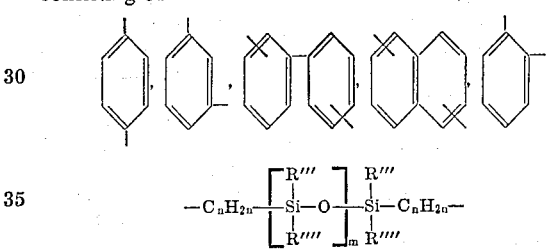

wherein $R'''$ and $R''''$ are an alkyl or an aryl group having 1 to 6 carbon atoms, $n$ is an integer of from 1 to 4 and $m$ has a value of 0, 1 or more and

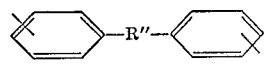

wherein $R''$ is selected from the group consisting of carbon in an alkylene chain having 1–3 carbon atoms, oxygen, silicon, phosphorous, sulfur, and nitrogen in

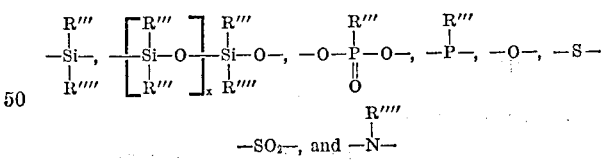

wherein $R'''$ and $R''''$ are as above-defined and $x$ is an integer of at least 0.

Specific diamines which are suitable for use in the present invention are:

meta-phenylene diamine,
para-phenylenediamine,
4,4'-diamino-diphenyl propane,
4,4'-diamino-diphenyl methane,
benzidine,
4,4'-diamino-diphenyl sulfide,
4,4'-diamino-diphenyl sulfone,
3,3'-diamino-diphenyl sulfone,
4,4'-diamino-diphenyl ether,
2,6-diamino-pyridine,
bis-(4-amino-phenyl) diethyl silane,
bis-(4-amino-phenyl) phosphine oxide,
bis-(4-amino-phenyl)-N-methylamine,
1,5-diamino naphthalene,
3,3'-dimethyl-4,4'-diamino-biphenyl,
3,3'-dimethoxy benzidine,
m-xylylene diamine,
p-xylylene diamine, 1,3-bis-delta-amino-butyltetramethyl disiloxane,
1,3-bis-gamma-aminopropyltetraphenyl disiloxane,
and mixtures thereof.

SOLVENT ADDITION

The solvents useful in the solution phase of this invention are the organic solvents whose functional groups do not react with either of the reactants (the diamines or the dianhydrides) to any appreciable extent. Besides being inert to the system and preferably, being a solvent for the polyamide acid, the organic solvent must be a solvent for at least one of the reactants, and preferably for both of the reactants. The organic solvent is an organic liquid other than either reactant or homologs of the reactants, that is a solvent for at least one reactant, and contains functional groups, the functional groups being groups other than monofunctional primary and secondary amino groups and other than the monofunctional dicarboxylanhydro groups. Such solvents include dimethylsulfoxide, N-methyl-2-pyrrolidone, the normally liquid organic solvents of the N,N-dimethylmethoxyacetamide, N-methylcaprolactam, etc., and tetramethylene urea, pyridine, dimethylsulfone, hexamethylphosphoramide, tetramethylenesulfone, formamide, N-methylformamide, butyrolacetone, and N-acetyl-2-pyrrolidone. The solvents can be used alone, as mixtures or in combination with poor solvents such as benzene, toluene, xylene, dioxane, cyclohexane, or benzonitrile.

AMMONIATING COMPOUNDS

The nitrogen containing bases that are useful in the process of this invention include, ammonia ($NH_3$), ammonium hydroxide ($NH_4OH$), ammonium carbonate $[(NH_4)_2CO_3]$, and primary and secondary aliphatic amines containing up to 4 carbon atoms such as methylamine, ethylamine, secondary butylamine, isopropylamine, dimethylamine, diethylamine, dibutylamine, etc. These materials convert the water insoluble polymer to a polyelectrolytic water soluble form.

In order that those skilled in the art may better understand how the invention may be practiced, the following examples are given by way of illustration and not by way of limitation. All parts by weight unless otherwise expressly set forth.

EXAMPLE 1

A Kady mill equipped with a cooling jacket was flushed with dry nitrogen, dewpoint —65° C. To the mill was charged 53,170 g. N-methyl-2-pyrrolidone (<0.01% water), followed by 6954 g. 3,3',4,4'-benzophenonetetracarboxylic dianhydride, B (>99.2% purity). The agitator was run for a period of 1.0 min. Then 2132 g. of p,p'-methylene dianiline, M (>99.9% purity) was added, slowly, with agitation over a period of 3 min. and the agitation continued for a period of 15 min. forming the BMB precursor, a clear solution with the temperature maintained at 25° C. To the BMB precursor was added slowly, over a period of 15 min. with agitation, 2184 g. of p,p'-methylene dianiline with agitation. During this period the temperature rise was controlled to a max. of 40° C. Agitation was continued for another 30 min. and the product withdrawn as the polyorthoamic acid. The carboxylic acid content was determined by titration in pyridine to a thymol blue end point with t-butylammonium hydroxide. The kinematic viscosity was 2560 cps. at 23.8° C. when reduced to a solids level of 17.5%. The percent imidization was determined to be 0.7±0.5%, or essentially a negligible amount. The inherent viscosity of this stock polymer solution was determined in N-methyl-2-pyrrolidone at 37.8° C. and found to be 0.60 dl./g. at $C=0.500$ g./dl. Gel permeation chromatographic data expressing number and weight average molecular weights of the polymer in terms of chain length in angstroms are presented in a table below. To a reactor equipped with stirring, nitrogen inlet and outlet, and cooling, was added 200 g. of the material at 17.5% solids and 20.0 ml. of N-methyl-2-pyrrolidone which resulted in a solids level of 15.9% and a kinematic viscosity after an equilibration period of about 20 hrs. at 23.8° C. of 1440 cps. at 23.8° C. To another 200 g. portion of 17.5% solids stock solution was added dropwise and with stirring 2.0 ml. of a 1.61% stock solution of 3,3',4,4'-benzophenonetetracarboxylic dianhydride in N-methyl-2-pyrrolidone. This resulted in a solids level of 15.9% and a kinematic viscosity after a similar period of equilibration of 1650 cps. at 23.8° C.

EXAMPLE 2

To a reactor equipped with stirring, nitrogen inlet and outlet, and cooling was added 200 g. of the 17.5% stock solution prepared in Example 1 followed by dropwise addition of 4.0 ml. of a 1.61% solution of 3,3',4,4'-benzophenonetetracarboxylic dianhydride in N-methyl-2-pyrrolidone and 16.0 ml. of N-methyl-2-pyrrolidone. This resulted in a solids level of 15.9% and a kinematic viscosity of 1860 cps. at 23.8° C. after an equilibration period as per Example 1. The inherent viscosity was found to be 0.66 dl./g. measured as per Example 1. Gel permeation chromatographic data expressing number and weight average molecular weights of the polymer in terms of chain length in angstroms are presented in a table below.

EXAMPLE 3

To the reactor as employed above was added 200 g. of the 17.5% stock solution prepared in Example 1 followed by dropwise addition of 8.0 ml. of a 1.61% solution of 3,3',4,4'-benzophenonetetracarboxylic dianhydride in N-methyl-2-pyrrolidone and 12.0 ml. of N-methyl-2-pyrrolidone. This resulted in a solids level of 15.9% and a kinematic viscosity of 2470 cps. at 23.8° C. This system had an inherent viscosity of 0.74 dl./g. measured as in Example 1. Gel permeation chromatographic data expressing molecular weight of the polymer in terms of chain length in angstroms are presented in a table below.

EXAMPLE 4

To the reactor as employed above was added 200 g. of the 17.5% stock solution prepared in Example 1 followed by dropwise addition of 12.0 ml. of a 1.61% solution of 3,3',4,4'-benzophenonetetracarboxylic dianhydride in N-methyl-2-pyrrolidone and 8.0 ml. of N-methyl-2-pyrrolidone. This resulted in a solids level of 15.9% and a kinematic viscosity of 3400 cps. at 23.8° C. This system had an inherent viscosity of 0.77 dl./g. measured as in Example 1.

EXAMPLE 5

To the reactor as employed above was added 200 g. of the 17.5% stock solution prepared in Example 1 followed by dropwise addition of 16.0 ml. of a 1.61% solution of 3,3',4,4'-benzophenonetetracarboxylic dianhydride in N-methyl-2-pyrrolidone and 4.0 ml. of N-methyl-2-pyrrolidone. This 15.9% solids system had a kinematic viscosity of 5110 cps. of 23.8° C. and an inherent viscosity of 0.79 dl./g. measured at 37.8° C. in N-methyl-2-pyrrolidone at $C=0.500$ g./dl. Gel permeation chromatographic data expressing number and weight average molecular weights of the polymer in terms of chain length in angstroms are presented for this and Examples 1, 2, and 3 in the following table.

| Ex. No. | Description of polymer system | $\eta_{inh}$ (dl./gm.) | $\bar{A}_n$ (angstroms) | $\bar{A}_w$ (angstroms) | MWD |
| --- | --- | --- | --- | --- | --- |
| 1 | BMB made to M/BMB=1.016/1.000. | 0.60 | 18,596 | 47,815 | 2.6 |
| 2 | Back addition of B to 1 | 0.66 | 24,375 | 85,214 | 3.5 |
| 3 | Back addition of B to 1 (3 2) | 0.74 | 35,672 | 204,022 | 5.7 |
| 5 | Back addition of B to 1 (5 3) | 0.79 | 48,289 | 196,276 | 4.6 | where $$\eta_{inh}=\frac{ln\eta/\eta_o}{C} \, dl.gm. \cong \frac{lnt/t_o}{C} \, dl./gm.$$

evaluated in N-methyl-2-pyrrolidone at 37.8° C. at $C= 0.500$ gm./dl.

$$\overline{A}_n=\frac{1}{Q}\,\overline{M}_n=\frac{1}{Q}\,\frac{\Sigma M_i N_i}{\Sigma N_i}\,\text{angstroms}$$

$$\overline{A}_w=\frac{1}{Q}\,\overline{M}_w=\frac{1}{Q}\,\frac{\Sigma M_i^2 N_i}{\Sigma M_i N_i}\,\text{angstroms}$$

where $A_n$ and $A_w$ are number average and weight average molecular weights, respectively, expressed in terms of chain length in angstroms.

$$MWD=\frac{\overline{A}_w}{\overline{A}_n}=\text{measure of the polydispersity of the system}$$

The general increase in molecular weight identified with kinematic and with inherent viscosity data is substantiated with data from g.p.c.

EXAMPLE 6

To a reactor as employed in examples above was added 200 g. of the 17.5% stock solution prepared in Example 1 followed by dropwise addition of 20 ml. of a 1.61% solution of 3,3′,4,4′-benzophenonetetracarboxylic dianhydride in N-methyl-2-pyrrolidone. This 15.9% solids system had a kinematic viscosity of 7760 cps. at 23.8° C. and an inherent viscosity of 0.81 dl./g. measured as cited above.

EXAMPLE 6a

To a reactor as employed above was added 200 g. of the 17.5% stock solution prepared in Example 1 followed by dropwise addition of 20 ml. of a 4.20% solution of the BMB precursor in N-methyl-2-pyrrolidone. This system in comparison with that of Example 6 had a kinematic viscosity of 7810 cps. at 23.8° C. and an inherent viscosity of 0.82 dl./g. measured as cited above.

EXAMPLE 7

To a reactor as employed above was added 200 g. of the 17.5% stock solution prepared in Example 1 followed by 30.0 ml. of N-methyl-2-pyrrolidone with agitation. This results in a 15.2% solids solution having a kinematic viscosity of 1150 cps. at 23.8° C. To another 200 g. portion of the stock solution was added, dropwise and with stirring 30.0 ml. of a 1.61% stock solution of 3,3′,4,4′-benzophenonetetracarboxylic dianhydride in N-methyl-2-pyrrolidone. This system had a kinematic viscosity of 24,200 cps. at 23.8° C. and an inherent viscosity, measured as above, of 0.91 dl./g.

EXAMPLE 8

To a reactor as employed above was added 200 g. of the 17.5% stock solution prepared in Example 1 followed by 40.0 ml. of N-methyl-2-pyrrolidone with agitation. This resulted in a 14.5% solids system having a kinematic viscosity of 920 cps. at 23.8°. To another 200 g. portion of the stock solution was added dropwise and with agitation 40.0 ml. of a 1.61% solution of 3,3′,4,4′-benzophenonetetracarboxylic dianhydride in N-methyl-2-pyrrolidone. The resulting system had a solids level of 14.7% and a kinematic viscosity of 6,590 cps. A summary of the results of Examples 1 through 8 is presented in the following table.

| Example number | Sample description, mg. BPDA/17.5 gm. polymer | Solids percent | Kinematic[1] viscosity at 23.8° C. (cps.) | Inherent[2] viscosity (dl./g.) |
|---|---|---|---|---|
| 1 | 0 | 17.5 | 2,560 | 0.60 |
| 1 | 0 | 15.9 | 1,440 | |
| 1 | 16 | 15.9 | 1,650 | |
| 2 | 32 | 15.9 | 1,860 | 0.66 |
| 3 | 64 | 15.9 | 2,470 | 0.74 |
| 4 | 96 | 15.9 | 3,400 | 0.77 |
| 5 | 128 | 15.9 | 5,110 | 0.79 |
| 6 | 160 | 15.9 | 7,760 | 0.81 |
| 7 | 0 | 15.2 | 1,150 | 0.60 |
| 7 | 240 | 15.3 | 24,200 | 0.91 |
| 8 | 0 | 14.5 | 920 | 0.60 |
| 8 | 320 | 14.7 | 6,590 | |

[1] Kinematic viscosity measurements were made following an equilibration period of about 20 hrs. at room temperature.
[2] The inherent viscosity was determined for C=0.500 g./dl. at 37.8° C. in N-methyl-2-pyrrolidone.

EXAMPLE 9

The polymer stock solution of Example 1 was treated with a "surfactant-flow agent" in the following manner: 60 p.p.m. of a carboxypropyl terminated dimethyl siloxane was incorporated and the formulated material employed as an enamel to coat copper wire in a conventional wire enameling tower. The coating was found to pass 25% elongation and 1–2× flexibility.

EXAMPLE 10

A polymer system prepared in accordance with Example 6 was treated with a "surfactant-flow agent" in the same manner as per Example 9 and employed as an enamel to coat copper wire in a conventional wire enameling tower. The coating was found to pass the equivalent of 40% elongation and 1× flexibility and exhibit superior coatability to the enamel of Example 9, particularly noticeable on more difficult to coat ("unshaved") wire.

EXAMPLE 11

A polymer system in a Regal vertical mixer to an inherent viscosity of 0.60 dl./g. with the stock solution of Example 1 but at 35.0% solids was treated as per Example 6 resulting in an inherent viscosity of 0.81 dl./g. to 2700 g. of this system was added with agitation 220 g. of conc. ammonia water followed by 2000 g. of distilled water. This material was employed as the ammonium polyorthoamate to coat copper wire and cured to the polyimide with laboratory simulated wire tower procedure. It was found on curing to pass 1× flexibility at 25% elongation at a 6 pass film build of about 3.0 mil on the diameter.

EXAMPLE 12

246 g. of N-methyl-2-pyrrolidone was charged to a reaction kettle equipped with agitation, nitrogen inlet and outlet, a thermometer, provision for controlled heating, and provision for withdrawal of water of condensation. To this was charged 33.4 g. of 3,3′,4,4′-benzophenonetetracarboxylic dianhydride, 2B, with stirring. After a period of several minutes 10.3 g. of p,p′-methylene dianiline, M, was added over a period of 5 minutes with stirring. After another period of several minutes the clear solution of BMB was raised in temperature to 95° C. and maintained for a period of 100 min. during which water of condensation was removed. The material, partially imidized BMB, was titrated for carboxylic acid and the percent imidization found to be 24.2%. After cooling to 23° C., an additional 10.5 g. of M was added slowly to the contents of the reactor with stirring and the temperature maintained at less than 40° C. There was no observed water of condensation. The material was titrated for carboxylic acid and the percent imidization found to be 12.1%. The polyorthoamicacid-imide was treated with 31 ml. of a solution of 1.61% 3,3′,4,4′-benzophenonetetracarboxylic dianhydride which resulted in a five-fold increase in the kinematic viscosity. A 100 g. sample of the product at about 18% solids was removed from the reaction kettle and treated with 5.0 ml. of conc. ammonia water. The resultant poly (ammoniumorthoamate-imide) polymer solution could be reduced with water to any solids level, yielding clear solutions.

EXAMPLE 13

A Regal mixer equipped with cooling to the jacket was flushed with dry nitrogen, dewpoint —65° C. and charged with 3760 g. of dry N-methyl-2-pyrrolidone (<0.01% water), followed by 360 g. (1.818 moles) p,p'-methylene dianiline, M (>99.7 purity). After stirring for about one minute, 293 g. 0.909 mole) 3,3',4,4'-benzophenonetetracarboxylic dianhydride, B (>99.5% purity), was added with stirring over a period of 5 minutes and the stirring continued for 15 minutes forming the MBM precursor. The maximum temperature during this period was 35° C. The temperature was reduced to 25° C. and the precursor zipped up by addition of 299 g. (0.927 mole) of 3,3',4,4'-benzophenonetetracarboxylic dianhydride, dropwise over a period of 15 min. with agitation and with the exotherm temperature rise controlled at a max. of 40° C.

The viscosity of the system at 40° C. was 2400 cps. To the reactor was added, continuously, dropwise, and with agitation over a period of 15 min. a solution of 3.6 g. of p,p'-methylene dianiline in 100 g. of N-methyl-2-pyrrolidone and the mixing continued under nitrogen and with cooling and with the temperature maintained at about 40° C. After an additional 45 min. of mixing the viscosity was found to be 4700 cps. at 40° C. After formation of the polymer, 200 g. of conc. ammonium hydroxide was added to the Regal with mixing. This was followed by addition of 600 g. of distilled water and the system stirred for about 30 min. resulting in a clear polymer solution. The polymer system was treated with a "flow agent-surfactant" in the following manner: 0.6% by total system weight of a conventional nonionic, nonylphenolethylene oxide adduct was incorporated. The resulting enamel was employed to coat copper wire in a conventional wire enameling tower. The resulting 3.0 mil. build coating was found to pass 25% elongation and 1× flexibility.

EXAMPLE 14

To a Regal mixer equipped with cooling and dry nitrogen atmosphere was charged 2596 g. of a BMB precursor prepared in accordance with Example 1 at 29.29% solids and comprised of 1.800 moles of B and 0.900 mole of M. To this was added slowly and with stirring over a period of 30 min. 2390 g. of an MBM precursor prepared in accordance with Example 13 at 27.3% solids and comprised of 1.818 moles of M and 0.909 mole of B. The mixing was continued for one hour and the exotherm controlled at a maximum of 40° C. The viscosity of the polymer system was found to be 3800 cps. at 40° C. To the reactor was added continuously over a period of 15 min. 100 g. of a 5.0% solution of 3,3',4,4'-benzophenonetetracarboxylic dianhydride in N-methyl-2-pyrrolidone. After an additional 60 min. of mixing the resulting clear polymer system was found to have a viscosity of 8000 cps.

EXAMPLE 15

A Regal mixer equipped with cooling to the jacket was flushed with dry nitrogen, dewpoint —65° C. and charged with 3760 g. of dry N-methyl-2-pyrrolidone (<0.01 water), followed by a mixture of 324 g. (1.636 moles) (1.818 moles) p,p'-methylenedianiline (>99.7% purity) and 36.5 g. (0.182 mole) p,p'-oxydianiline (>99.5% purity), M. After stirring for about one minute, 293 g. (0.909 mole) 3,3',4,4'-benzophenonetetracarboxylic dianhydride, B (>99.5% purity), was added with stirring over a period of 5 minutes and the stirring continued for 15 minutes forming the MBM' precursor. The maximum temperature during this period was 35° C. The temperature was reduced to 25° C. and the precursor zipped up by the slow addition of 299 g. (0.927 mole) of 3,3',4,4' - benzophenonetetracarboxylic dianhydride, dropwise over a period of 15 min. with agitation and with the exotherm temperature rise controlled at a max. of 45° C. The viscosity of the system at 40° C. was 2560 cps. A solution of 3.6 g. of p,p'-methylene dianiline in 100 g. of N-methyl-2-pyrrolidone was added, dropwise, to the reactor with mixing over a period of 15 min. After an additional 45 min. of mixing the viscosity was found to be 5200 cps. at 40° C. After formation of the polymer, 200 g. of an aqueous, 28% solution of ammonium hydroxide was added with mixing, followed by addition of 600 g. of distilled water. After a period of about 30 min. the clear polymer solution was treated with a "flow agent-surfactant" as in Example 13. The resulting enamel was employed to coat copper wire and the coating of about 3.0 mil build found to pass 25% elongation and 1× flexibility.

The foregoing examples indicate the usages of reactants in the following manner, summarized in "Table of Reactants":

TABLE OF REACTANTS

| Starting reactant | Additional reactant | Back titration reactant |
| --- | --- | --- |
| BMB | M | B |
| BMB | M | BMB |
| BMB | MBM | B |
| BMB | MBM | BMB |
| MBM | B | M |
| MBM | B | MBM |
| MBM | BMB | M |
| MBM | BMB | MBM |

While I have emphasized the applicability of my coating process to the production of magnet wire insulation enamels, it will be appreciated that my invention is also useful in many other areas. For example, the films formed in accordance with my invention may find use in all high temperature insulation applications. For example stator and rotor slot insulators, transformers, cable casings, capacitors, and for various laminating processes. In each case the coating process will provide a low-cost, high-class insulator or bonding agent that can be used in place of existing materials. Other potential uses of my coating process of forming water-borne coating solutions with or without minor modifications, will occur to those skilled in the art, and I intend, therefore, in the following claims, to cover all such equivalent variations as fall within the true spirit and scope of this invention.

The embodiments of the invention in which an exclusive property or privilege is claimed are defined as follows:

1. A process for producing a polyamide coating material for substrates comprising the steps of:
   (a) dissolving (1) an anhydrous carbocyclic aromatic dianhydride and (2) an aromatic diprimary diamine, wherein the molar ratio of dianhydride to diamine is 21; in an organic solvent which is nonreactive with either of the reactants, but is a solvent for the reaction product of (1) and (2);
   (b) reacting at a temperature below the imidization temperature, said anhydrous reaction product of (1) and (2) to form a stable precursor bis-amide of the general Formula XYX, wherein:
     X is

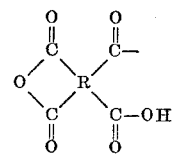

Y is —NH—R'—NH—,
   R is an aromatic carbocyclic radical, and
   R' is an aromatic radical;
   (c) adding a solution of phase molar ratio excess of said diamine (Y) to XYX;

(d) and thereafter slowly back-tritrating below the imidization temperature the product formed in step (c) with said dianhydride to react with the terminal diamine groups to approach a 1/1 ratio of said dianhydride to said diamine.

2. The process in accordance with claim 1 including the step of converting, by heating at a temperature above the imidization temperature, the bis-amide XYX to an amide-imide subsequently to steps (a) and (b).

3. The process in accordance with claim 1 wherein the nitrogen-containing base is added subsequently to the production of said step (c) product and such base consists of ammonia.

4. The process in accordance with claim 2, wherein step (c) is carried out at a temperature below the imidization temperature and while said bis-amide is within said solvent.

5. The process in accordance with claim 1 including the step of adding nitrogen-containing base to said bis-amide formed in step (c) to preclude conversion of same to a gel and to render same water soluble.

6. The process in accordance with claim 2 including the step of blending with said amide imide a quantity of said bis-amide.

7. The process in accordance with claim 1 wherein said solvent is comprised of N-methyl pyrrolidone.

8. The process in accordance with claim 1 wherein the carbocyclic aromatic dianhydride consists of benzophenonetetracarboxylic dianhydride and the aromatic diamine consists of p,p'-methylenedianiline.

9. The process in accordance with claim 2 wherein said solvent is comprised of N-methyl pyrrolidone.

10. The process in accordance with claim 6 in which the precursor consists of XYX and the additional reactant is Y and the back-tritration reactant is X.

11. The process in accordance with claim 6 which the precursor material is XYX and the additive reactant is YXY and the back-tritration reactant is X.

12. The process in accordance with claim 6 in which the precursor material is XYX, the additional reactant is Y and the back-tritration reactant is XYX.

13. The process in accordance with claim 6 in which the precursor material is XYX, the additive reactant is YXY and the back-tritration reactant is XYX.

14. The process in accordance with claim 6 in which the precursor material is YXY, the additional reactant is X and the back-tritration reactant is Y.

15. The process in accordance with claim 6 in which the precursor material is YXY, and the additive reactant is XYX and the back-titration reactant is Y.

16. The process in accordance with claim 6 in which the precursor material is YXY, the additional reactant is XYX and the back-tritration reactant is YXY.

17. The process in accordance with claim 6 in which the precursor material is YXY, the additional reactant is X and the back-tritration reactant is YXY.

18. The process in accordance with claim 5 in which the substrate is comprised of magnet wire.

19. A process for producing a polyamide coating material for substrates comprising the steps of:
(a) dissolving (1) an anhydrous carbocyclic aromatic dianhydride and (2) an aromatic diprimary diamine, wherein the molar ratio of dianhydride to diamine is 1/2, in an organic solvent which is nonreactive with either or both of the retactants but is a solvent for the reaction product of (1) and (2);
(b) reacting at a temperature below the imidization temperature said anhydrous combination of (1) and (2) to form a stable precursor bis-amide of the general Formula YXY, wherein;
X is

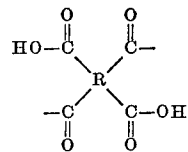

Y is NH$_2$—R'—NH—,
R is an aromatic carbocyclic radical, and
R' is an aromatic radical;
(c) adding a solution phase molar ratio excess of said dianhydride (X) to the (YXY);
(d) and thereafter slowly back-tritrating at a temperature below 50 degrees C., the solution phase product of step (c) with said diamine to react with the terminal anhydride groups to approach a 1/1 ratio of said dianhydride to said diamine.

20. The process in accordance with claim 19 including the step of converting, by heating at a temperature above 50 degrees C., the bis-amide YXY to an amide-imide subsequently to the formation steps of (a) and (b).

21. The process in accordance with claim 20 wherein step (c) occurs at a temperature below 50 degrees C., with said amide-imide within said solvent.

22. The process in accordance with claim 20 including the step of blending with said amide-imide a quantity of said bis-amide.

23. The process in accordance with claim 19 including the step of adding nitrogen-containing base to said bis-amide YXY formed in step (b) to preclude conversion of same to a gel and to render same water soluble.

24. The process in accordance with claim 19 wherein the carbocyclic aromatic consists of benzophenonetetracarboxylic dianhydride and the aromatic diamine consists of p,p'-methylenedianiline.

25. The process in accordance with claim 19 wherein the nitrogen-containing base is added subsequently to the production of the step (c) product and such base consists of ammonia.

References Cited

UNITED STATES PATENTS

| | | | |
|---|---|---|---|
| 3,426,098 | 2/1969 | Meyer et al. | 260—65 |
| 3,440,196 | 4/1969 | Boldebuck et al. | 260—29.2 |
| 3,459,706 | 8/1969 | Schweitzer | 260—47 |
| 3,485,796 | 12/1969 | Naselow | 260—65 |
| 3,511,807 | 5/1970 | Lovejoy | 260—78 |
| 3,179,614 | 4/1965 | Edwards. | |
| 3,179,630 | 4/1965 | Endrey. | |
| 3,179,631 | 4/1965 | Endrey. | |
| 3,179,632 | 4/1965 | Hendrix. | |
| 3,179,633 | 4/1965 | Endrey. | |
| 3,179,634 | 4/1965 | Edwards. | |
| 3,190,856 | 6/1965 | Larvin et al. | |
| 3,242,128 | 3/1966 | Chalmers. | |
| 3,242,136 | 3/1966 | Endrey. | |
| 3,347,808 | 10/1967 | Lavin et al. | 260—29.2 |
| 3,377,310 | 4/1968 | Serlin et al. | |

FOREIGN PATENTS

| | | |
|---|---|---|
| 1,506,519 | 11/1967 | France. |
| 903,271 | 8/1962 | Great Britain. |

HAROLD D. ANDERSON, Primary Examiner

U.S. Cl. X.R.

117—128.4; 260—46.5 E, 47 CP, 78 TF

Disclaimer 3,663,510.—*Marvin A. Peterson*, Fort Wayne, Ind. PROCESS FOR PRODUCING POLYAMIDE COATING MATERIALS. Patent dated May 16, 1972. Disclaimer filed Jan. 14, 1975, by the assignee, *General Electric Company*.

Hereby disclaims the term of this patent subsequent to Mar. 28, 1989.

[*Official Gazette April 8, 1975.*]